T. S. Blair,

Pile for Railroad Rails,

No. 1,582. Reissued Dec. 1, 1863.

Witnesses:

A. B. Stoughton

Xaver Sindrich.

Inventor:

Thos. S. Blair

UNITED STATES PATENT OFFICE.

THOMAS S. BLAIR, OF PITTSBURG, PENNSYLVANIA.

IMPROVEMENT IN RAILROAD-RAILS.

Specification forming part of Letters Patent No. 38,548, dated May 19, 1863; Reissue No. 1,582, dated December 1, 1863.

*To all whom it may concern:*

Be it known that I, THOMAS S. BLAIR, of Pittsburg, in the county of Allegheny and State of Pennsylvania, have invented a new and useful improvement in rails for railroads, consisting in a rail having a steel surface for resisting wear without increased liability to fracture, and at so moderate an increase in cost as not to forbid its introduction into common use; and I do hereby declare that the following is a full, clear, and exact description of the same, reference being had to the accompanying drawings, making part of this specification, in which—

Figure 1:
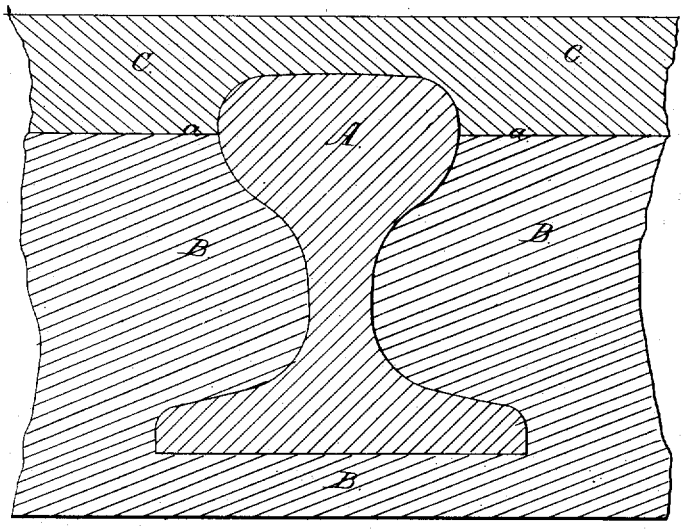
Figure 2:
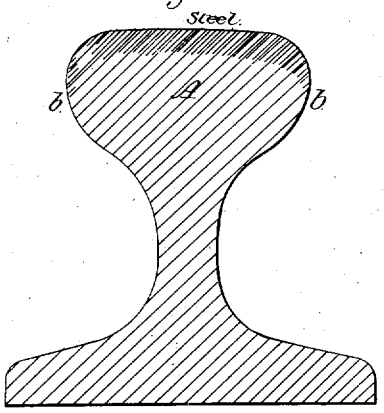

Figure 1 represents an end view of a rail packed partly in clay, sand, or other medium for isolation, and partly in charcoal or other carbonaceous matter for the purpose of carbonizing or converting into steel the head or tread of the rail while the remaining portion remains in the condition of iron. Fig. 2 represents a similar end view after the rail has been through the converting or carbonizing process, the more dense lines representing the portion which has been carbonized and the less dense lines representing the portion which remains in the condition of iron.

I am aware that rails made entirely of steel have been employed for railway use, but their great cost and their liability to fracture, especially at a low degree of temperature, offset their advantage in the matter of wear and render their use for the most part inexpedient. I am aware also that a plate or face of steel has been welded upon the upper portion of the rail for railway use; but, besides the great expense of this process, a fatal objection lies in the fact that such steel head separates and peels off from the rail under the rolling and kneading action of the wheels which pass over it. I am aware, also, that the process of case-hardening has been applied to rails, but the influence of the process is strictly superficial and affects merely the skin of the rail, which speedily laminates off and leaves the rail in the ordinary unprotected condition. I am aware, finally, that attempts have been made to produce a rail, part of iron and part of blister steel, without welding, by imparting carbon to a portion of the surface in the converting-furnace while the rest of the surface was isolated in order to retain it in the condition of iron; but all such attempts have hitherto proven fruitless and have been abandoned. No specimen of a useful rail has ever been so produced, because the surface so carbonized has been left rough, blistered, and crooked, or if prevented from crooking yet the other objections remained, and the texture of the carbonized part has remained crystalline, and the rail has therefore been too brittle to be used with safety.

The nature of my invention consists in combining the carbonization of a part with the subsequent rerolling of the whole rail while still hot, or, in special cases, after reheating.

To enable others skilled in the art to make and use my invention to produce the new article which I describe, I proceed to explain and describe the process, reference being had to the drawings.

I take the rails A, either in the finished condition in which they are commonly laid down upon the track, or else in a condition not entirely finished, requiring one or more passes through the finishing-rolls, and I proceed to pack them in the "pots" of a converting-furnace of ordinary construction for producing blister-steel, where they shall receive carbonization in the well-known usual way.

The packing with which I surround the rails may consist entirely of carbonaceous materials, or, as in Fig. 1, only so much of it as surrounds the head of the rail, represented by C, the rest of the surface of the rails being placed in contact with clay, sand, or other isolating, non-carbonaceous materials, represented by B. The pots being filled with successive layers of rails and sealed up, heat is applied, as practiced in the usual manufacture of blister-steel, until the trial-bars indicate that the desired degree of carbonization has been attained. The fire may then be extinguished, and the furnace and its contents allowed to cool, and the rails afterward removed in readiness for the next step in the process. But I prefer to make the breasts of the pots removable at pleasure in sections, so that the rails may be withdrawn one by one while still at a sufficiently high heat and immediately taken to and passed through the rolls until the blisters are reduced and removed, the surface rendered smooth, and the texture of the carbonized portion of the rai changed from that characterizing blister-steel to that characterizing spring-steel—that is, condensed and toughened—after which the rails are straightened in the common way and put to use.

If it be desirable to have additional hardness of surface for special cases, the rails, while still hot from the rolling, may be tempered in water, oil, or any other liquid now employed in the treatment of steel for that purpose; but this is not an essential part of the process.

Having thus fully described the nature, purpose, and object of my invention, what I claim therein, and desire to secure by Letters Patent, is—

A new article of production useful in the arts, to wit: a tempered or untempered railway-rail, partly iron and partly steel, carbonized and rerolled, substantially in the manner and for the purpose hereinabove described.

THOS. S. BLAIR.

Witnesses:

J. Z. SPEER,

LEONARD S. JOHNS.